US012416200B1

(12) United States Patent
Shipley

(10) Patent No.: US 12,416,200 B1
(45) Date of Patent: Sep. 16, 2025

(54) FLOOD PANEL BARRIER SYSTEM FOR A THROUGHWAY OF A STRUCTURE

(71) Applicant: Flood Risk America, Inc., Lake Worth, FL (US)

(72) Inventor: Walker Shipley, Lake Worth, FL (US)

(73) Assignee: Flood Risk America, Inc., Lake Worth, FL (US)

( * ) Notice: Subject to any disclaimer, the term of this patent is extended or adjusted under 35 U.S.C. 154(b) by 0 days.

(21) Appl. No.: 18/948,979

(22) Filed: Nov. 15, 2024

(51) Int. Cl.
*E06B 9/00* (2006.01)

(52) U.S. Cl.
CPC .......... *E06B 9/00* (2013.01); *E06B 2009/007* (2013.01)

(58) Field of Classification Search
CPC ... E04H 9/145; E02B 7/54; E02B 7/38; E02B 7/20; E02B 7/02; E02B 7/00; E06B 9/00; E06B 2009/015
See application file for complete search history.

(56) References Cited

U.S. PATENT DOCUMENTS 6,042,301 A 3/2000 Sovran
6,450,733 B1 9/2002 Krill et al.
7,364,385 B1 4/2008 Luke
7,815,397 B1 * 10/2010 Dung ...................... E02B 3/102 405/91
8,974,144 B1 * 3/2015 Happel ..................... E02B 7/28 405/105
9,537,183 B2 * 1/2017 Appelboom ........ H01M 10/465
9,885,162 B1 2/2018 Munz
11,035,141 B1 * 6/2021 Shorten ..................... E06B 9/02
2006/0151770 A1 7/2006 Payne
2008/0245009 A1 10/2008 Temple et al.
2014/0369760 A1 12/2014 Venton
2015/0204040 A1 7/2015 Knezevich et al.
2017/0218586 A1 8/2017 Knezevich et al.
2019/0211521 A1 7/2019 Waters, Jr.
2024/0026732 A1 1/2024 Mitchell

FOREIGN PATENT DOCUMENTS

KR 102724918 * 11/2024

* cited by examiner

*Primary Examiner* — Kyle Armstrong
(74) *Attorney, Agent, or Firm* — The Concept Law Group, PA; Scott D. Smiley; Scott M. Garrett

(57) ABSTRACT

A flood panel barrier system is configured to block flood water from intruding into a structure at a throughway that leads into the structure. The flood panel barrier system takes advantage of the walls of the structure being water impermeable, such that water cannot pass into the structure through the walls. A flood panel extends across the through way and is fastened to the opposing walls. Vertical angled brackets are used to fasten the flood panel to the walls, including gaskets between the bracket and the walls and flood panel. There is also a horizontal angled bracket across the bottom of the flood panel to fasten the flood panel to the ground surface, with a gasket between the ground surface and the horizontal angled bracket and the bottom of the flood panel. The flood panel has a removable portion that allows people to move through the flood panel when flood panel barrier system is installed, and before the are flood waters.

15 Claims, 9 Drawing Sheets

FLOOD PANEL BARRIER SYSTEM FOR A THROUGHWAY OF A STRUCTURE

FIELD OF THE INVENTION

The present invention relates generally to flood barriers to prevent flood water intrusion into a building or other structure, and, more particularly, relates to a flood panel barrier system for a throughway, such as an alley or a doorway, or other space between two opposing walls.

BACKGROUND OF THE INVENTION

Water intrusion into buildings and structures due to flooding is responsible for a large amount of property damage. Flooding occurs as a result of rain, snow melt, and storm surge along coastlines, among other causes. As a result, flooding can occur in many different places in both rural and urban locations. In general, barriers have proven to be very effective at protecting property from flood water intrusion, and allow personnel to manage flood waters. There are numerous kinds of barriers, from sand bag barriers to earthen dykes with mechanically stabilized soil, and in many places panel systems are used. A panel system is a series of water-impermeable panels that are mounted to, or adjacent to a building or structure, and to the ground surface around the building or structure, in a substantially water tight arrangement. These barrier systems typically require angled braces for structural support on the back side (facing the building or structure being protected) to ensure the panels are not pushed inward and defeated by the water pressure during a flood event. This results in a minimum distance being necessary between the back of the panel barrier and the structure in order to fit the braces in between the panels and the building or structure. However, in some application, a building or structure need not be surrounded by a panel barrier because the external walls of the structure are effective at blocking water intrusion. This is true, for example, when the walls are made of poured concrete, for example. In those cases, only the throughways present an ingress point where water could intrude into the structure. A throughway is an opening into the structure that people pass through to enter and exit the structure, and there are typically opposing walls on each side of the opening. These walls are often part of the water-resistant portion of the structure. Conventionally, a flood panel barrier across a throughway may require a supporting member at the backside of the barrier (the dry side) to resist the force of water. In addition, if someone needed to ingress into, or egress from the structure through the throughway, they would have to climb over the panel barrier to do so, once it is in place.

Therefore, a need exists to overcome the problems with the prior art as discussed above.

SUMMARY OF THE INVENTION

In accordance with some embodiments of the inventive disclosure, there is provided a flood panel barrier system for a throughway. The system includes a flood panel that has a first side and a second side, and which extends across a throughway, from a first wall that defines a first side of the throughway, to a second wall that is opposite the first wall across the throughway and that defines a second side of the throughway. The flood panel is on a ground surface of the throughway at a bottom of the flood panel. The is a first vertical angled bracket that has a wall portion and a panel portion at an angle to each other. The wall portion is fastened to the first wall. The panel portion is fastened to the flood panel at the first side of the flood panel. There is a first wall gasket disposed between the wall portion and the first wall, and a first panel gasket disposed between the panel portion and the first side of the flood panel. The system also includes a second vertical angled bracket that has a wall portion and a panel portion at an angle to each other. The wall portion is fastened to the second wall, and the panel portion is fastened to the flood panel at the first side of the flood panel. A second wall gasket is disposed between the wall portion and the second wall, and a second panel gasket disposed between the panel portion and the first side of the flood panel. The system further includes a horizontal angled bracket having a ground portion and a panel portion at an angle to each other. The ground portion is fastened to the ground surface between the first wall and the second wall and there is a floor gasket between the ground portion and the ground surface. The panel portion is fastened to the flood panel along the flood panel adjacent the bottom of the flood panel at the second side of the flood panel.

In accordance with a further feature, the flood panel includes a removable portion that extends from a top of the flood panel downward.

In accordance with a further feature, the removable portion include a frame that is sized to fit into a bay in the flood panel.

In accordance with a further feature, the wall portion of the first vertical angled bracket is fastened to the first wall by a first plurality of fastening units, the wall portion of the second vertical angled bracket is fastened to the second wall by a second plurality of fastening units, wherein each fastening unit of the first and second plurality of fastening units includes a bolt, an anchor embedded in a bore into which a distal end of the bolt is threaded, a washer, and an adjustment knob threaded onto the bolt.

In accordance with a further feature, there is further included, at the bottom of the first vertical angled bracket, and first ground support bracket, and at the bottom of the second vertical angled bracket, a second ground support bracket.

In accordance with some embodiments of the inventive disclosure, there is provided a flood panel barrier system for a throughway between a first wall and a second wall. The system includes a flood panel having a first or front side and a second or rear side. The flood panel extends across the throughway from the first wall to the second wall. A bottom or bottom edge of the flood panel is against a ground surface of the throughway, which can include a gasket between the bottom of the flood panel and the ground surface. The flood panel has a bay extending from a top of the flood panel downward toward the bottom of the flood panel. There is a removable portion mounted in a frame that is configured to fit into the bay in a water tight manner. There is a first vertical angled bracket having a wall portion and a panel portion at an angle to each other. The wall portion is fastened to the first wall, and the panel portion is fastened to the flood panel at the first side of the flood panel. There is a first wall gasket disposed between the wall portion and the first wall, and there is a first panel gasket disposed between the panel portion and the first side of the flood panel. There is a second vertical angled bracket having a wall portion and a panel portion at an angle to each other. The wall portion of the second angled bracket being fastened to the second wall, and the panel portion of the second angled bracket being fastened to the flood panel at the first side of the flood panel. There is a second wall gasket disposed between the wall portion and the second wall, and there is a second panel gasket disposed between the panel portion and the first side of the flood panel. The system also includes a horizontal angled bracket that has a ground portion and a panel portion at an angle to each other. The ground portion is fastened to the ground surface between the first wall and the second wall, and there is a floor gasket between the ground portion and the ground surface. The panel portion is fastened to the flood panel barrier along the flood panel adjacent the bottom of the flood panel at the second side of the flood panel.

In accordance with a further feature, the frame has a backing flange portion to which the removeable portion is fastened, and a front flange portion that extends outward to bear against a front side of the flood panel.

In accordance with a further feature, the wall portion of the first vertical angled bracket is fastened to the first wall by a first plurality of fastening units, the wall portion of the second vertical angled bracket is fastened to the second wall by a second plurality of fastening units, wherein each fastening unit of the first and second plurality of fastening units includes a bolt, an anchor embedded in a bore into which a distal end of the bolt is threaded, a washer, and an adjustment knob threaded onto the bolt.

In accordance with a further feature, the removable portion is transparent.

In accordance with a further feature, there is further included, at the bottom of the first vertical angled bracket, and first ground support bracket, and at the bottom of the second vertical angled bracket, a second ground support bracket.

In accordance with some embodiments of the inventive disclosure, there is also provided a flood panel for a flood panel barrier system that includes a planar body. The planar body has a back side and a front side, a width that extends from a first vertical edge to a second vertical edge, and a height that extends from a bottom to a top. The flood panel also includes a removable portion that fits into a bay in the planar body, and which extends from the top of the planar body downward. The removable portion is mounted in a frame that fits into the bay and creates a seal around the frame.

In accordance with a further feature, the frame comprises a backing flange portion that partially extends across a back side of the removable portion, a transverse portion that extends at a right angle from the backing flange portion a distance equal to a thickness of the planar body, and a front flange portion that extends outward from the transverse portion at a right angle to the transverse portion, opposite the distance from the backing flange portion.

In accordance with a further feature, the removable portion is fastened to the backing flange portion of the frame.

In accordance with a further feature, the removable portion is transparent.

In accordance with a further feature, the removable portion extends downward more than half of the height of the planar body.

Although the invention is illustrated and described herein as embodied in a flood panel barrier system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
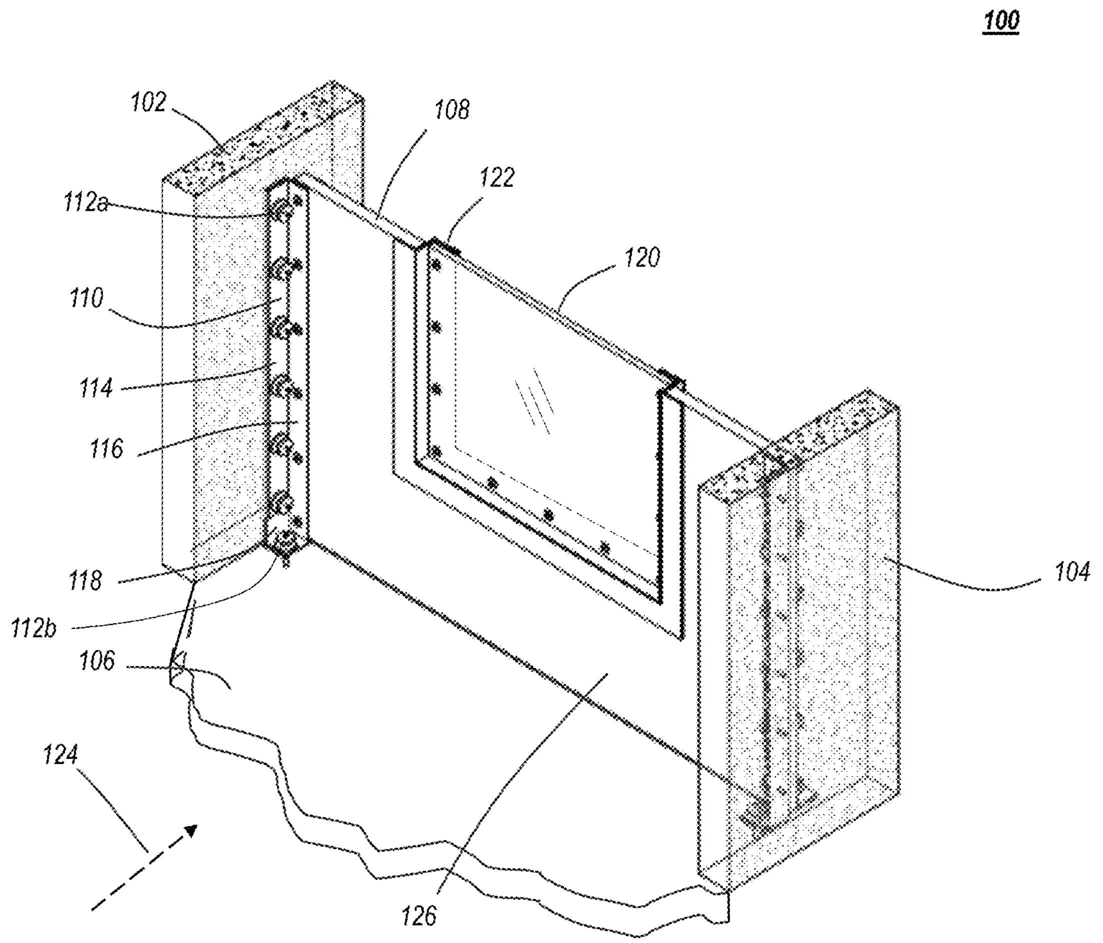
FIG. 1A is a front perspective view of a flood panel barrier system for a throughway, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1A is a front perspective view of a flood panel barrier system 100 for a throughway, in accordance with some embodiments. FIG. 2 is a rear perspective view of the flood panel barrier system 100, and reference should be made to both drawings in the following description. FIG. 1 shows the "wet" side of the barrier with flood water coming from the direction of arrow 124. A throughway is defined between two opposing walls 102, 104, where only a section of the walls 102, 104 are shown there it should be understood that the walls 102, 104 extend upwards, as well as to the front and rear. There is a ground surface 106 between the walls 102, 104 that can be a water-impermeable surface, as are the walls 102, 104. The walls 102, 104 and ground surface 106 can define an entryway into a building or other structure, or it can be a separation between two adjacent structures, such as, for example, an alley or walkway. The throughway is a point at which flood water could pass, and enter into a structure or structures.

The prevent flood water ingress through the throughway, a flood panel 108 is placed between, and fastened to the walls 102, 104 in a "water tight" arrangement that prevents flood waters from passing through the throughway and into the structure. The flood panel, or simply "panel" 108 is a rigid, water impermeable member having a generally planar body that can be sized for a specific throughway, or standardized to fit on standardized throughways. The planar body of the flood panel 108 has a width, a height, and a thickness. The width is measured in the horizontal direction when the panel 108 is placed in the throughway. The height is measured in the vertical direction, and the thickness is measured from the first or front side to the second or rear side in a direction perpendicular to the sides of the planar body. The planar body also has a first vertical edge. The panel 108 has a front side 126 (FIG. 1) and a rear side 128 (FIG. 2), which can be defined by the internal structure of the panel 108, or simply by how it is placed in the throughway (e.g., the "front" side is the one facing outward from the throughway when the panel 108 is put in place in the throughway). At the ends of the panel 108, which are against, or very close to the walls 102, 104, and at the front side 126, there are vertical angled brackets 110, 130 that fasten the panel 108 to the walls 102, 104. The vertical angled brackets 110 have a wall portion 114 that interfaces with the wall (102 or 104), and a panel portion 116 that interfaces with the panel 108 at the front side 126 of the panel 108. The wall portion 114 and panel portion 116 can be at a right angle to each other, and extend from the ground surface 106 upwards. The ground surface 106 is understood to be a hard, water impermeable material, such as, for example, concrete. A plurality of fastening units 112*a* include a bolt that passes through the wall portion 114 and into an anchor embedded in a corresponding bore in the wall 102, 104, as will be described. The fastening units described herein all use the reference numeral "112," and have an alphabetic suffix a-e to indicate their location, but they are otherwise very similar, as will be described in reference to FIG. 3. The ground surface 106 must both resist erosive forces of flowing and standing water, as well as provide a suitable anchor medium for fastening units 112. The fastening units 112*a* are disposed at regular intervals along the wall portion 114 and fasten the wall portion 114 to the wall 102, 104. In addition, there are other fastening units 112*c* that pass through the panel 108 and the panel portion 116 to fasten the panel portion 116 to the panel 108. The vertical angled brackets 110, 130 are made of a rigid material, such as any of various polymeric materials, aluminum, stainless steel, and so on. There are openings at regular intervals along the length of the angled vertical brackets 110, 130 in both the wall portion 114 and the panel portion 116 for the fastening units 112*a*, 112*c*.

At the bottom of the vertical angled brackets 110, 130 there is a ground support bracket 118 that is itself an angled bracket having a vertical portion that is against the wall portion 114, and a horizontal portion that interfaces against the ground surface 106, and which is held in place by a fastening unit 112*b* that connects to an anchor that is embedded in a bore in the ground surface 106. The ground support bracket 118 also has an inner side along both the horizontal and vertical portions that bear against the panel portion 116 of the vertical angled bracket 110.

Figure 1B:
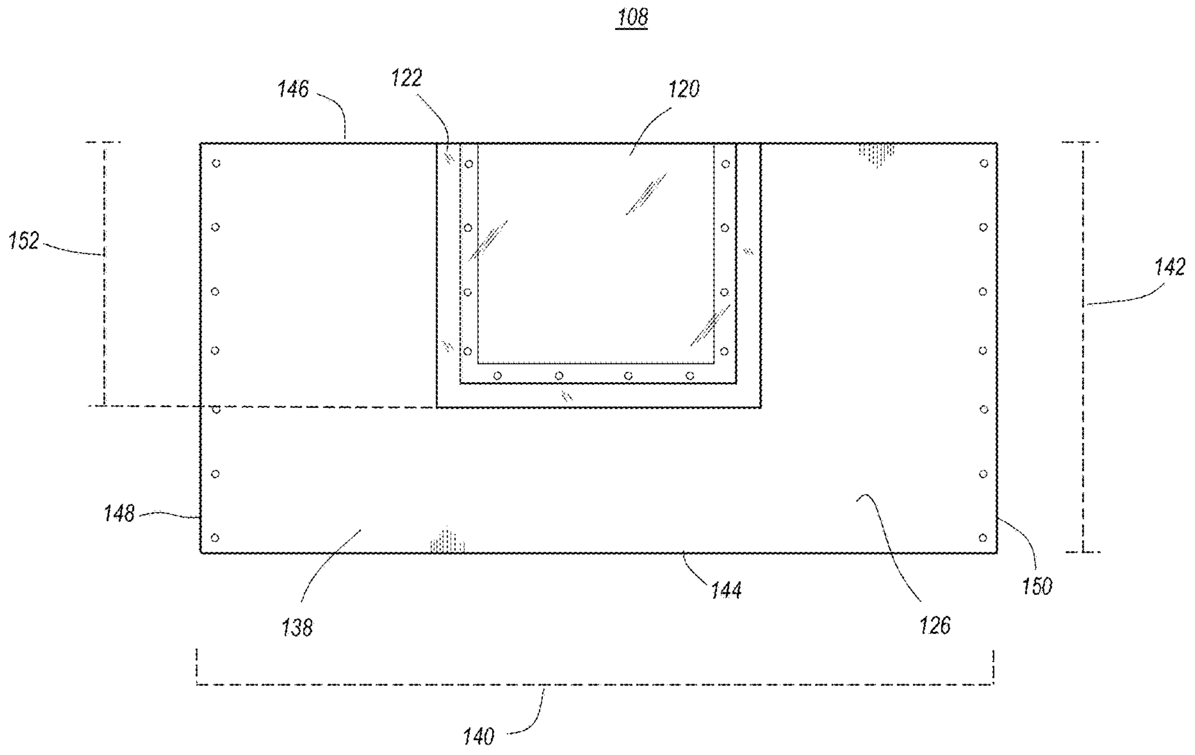
FIG. 1B is a front elevation view of a flood panel for a flood panel barrier system, in accordance with some embodiments.
Figure 2:
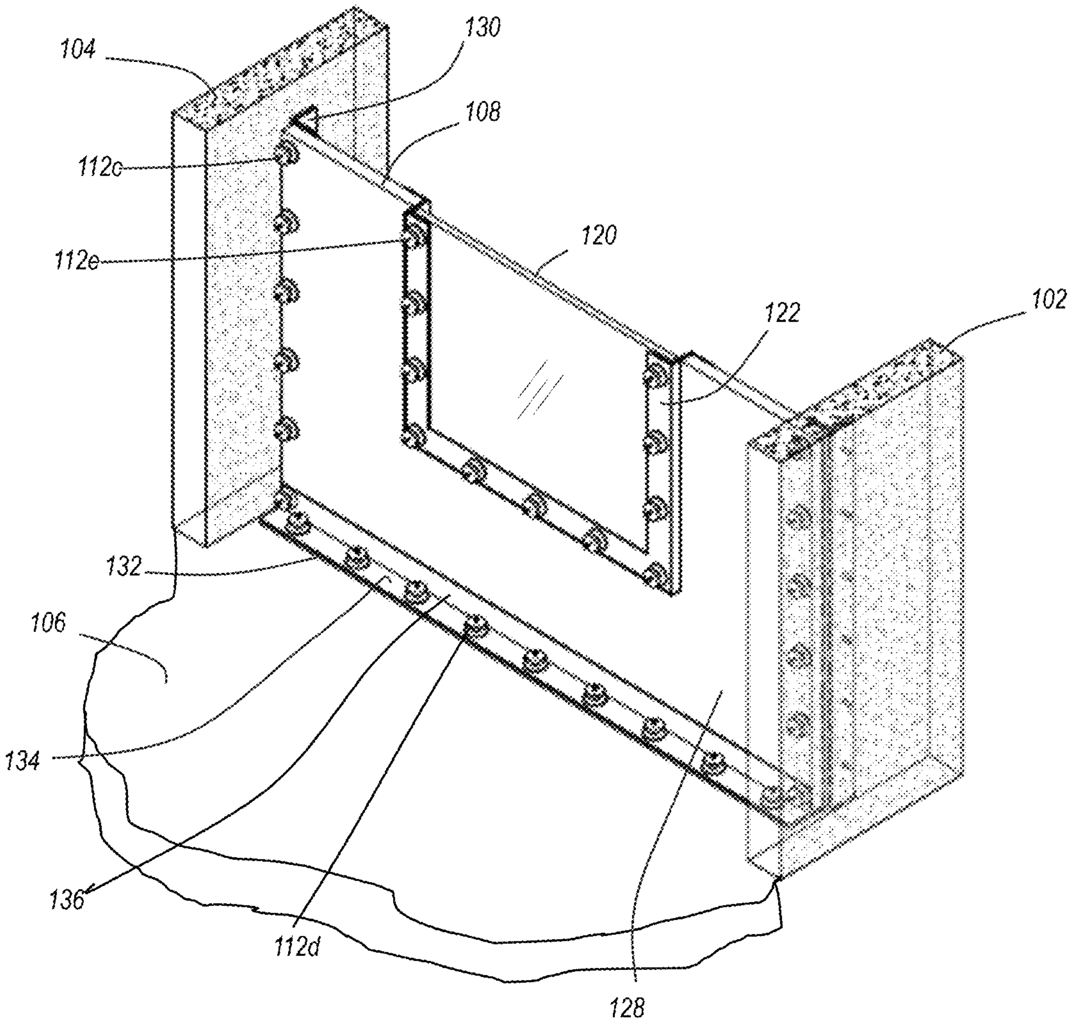
FIG. 2 is a rear perspective view of a flood panel barrier system for a throughway, in accordance with some embodiments.

FIG. 1B shows a front elevation view of a flood panel 108 for a flood panel barrier system 100, in accordance with some embodiments. The flood panel 108 includes a generally planar body 138 having a front side 126 and a rear side (128). The planar body 138 has a width 140 which is measured in the horizontal direction when the panel is oriented and placed for use. It has a height 142, and the removable portion 120 and frame can extend from the top 146 downwards, towards the bottom 144 of the planar body 138 a distance 152 that is more than half the height 142 in some embodiments. The planar body 138 also has a first vertical edge 148 and a second vertical edge 150.

At the rear side 128, as seen in FIG. 2, there is a horizontal angled bracket 132 that is used to fasten the bottom of the panel 108 to the ground surface 106. The horizontal angled bracket 132 extends across the entire width of the panel 108, from the first wall 102 to the second wall 104, and has a ground portion 134 that interfaces with the ground surface 106, and a panel portion 136 that interface with the panel 108 at the bottom of the panel 108 adjacent the bottom edge of the panel 108. A plurality of fastening units 112*d* fasten the ground portion 134 of the horizontal angled bracket 132 to the ground surface 106. Each one of the fastening units 112*d* includes a bolt that passes through the ground portion 134 and into an anchor that is embedded in a bore in the ground surface 106. Another plurality of fastening units 112*c* passes through the panel 108 at the sides, in a vertical series, to fasten the panel portion 116 of the vertical angled brackets 110, 130. As can be seen in FIG. 2, the tightening portion of the fastening units 112*c* are on the rear side 128 of the panel 108. This allows personnel to tighten any of the fastening units 112*c* from inside the structure, when there is flood water present at the front side 126 of the panel 108. Likewise, having the horizontal angled bracket 132, with its fastening units 112*d* on the "dry" side of the panel 108 allows tightening of the fastening units 112*d* as may be needed, when there is flood water present at the front side of the panel 108.

Figure 6:
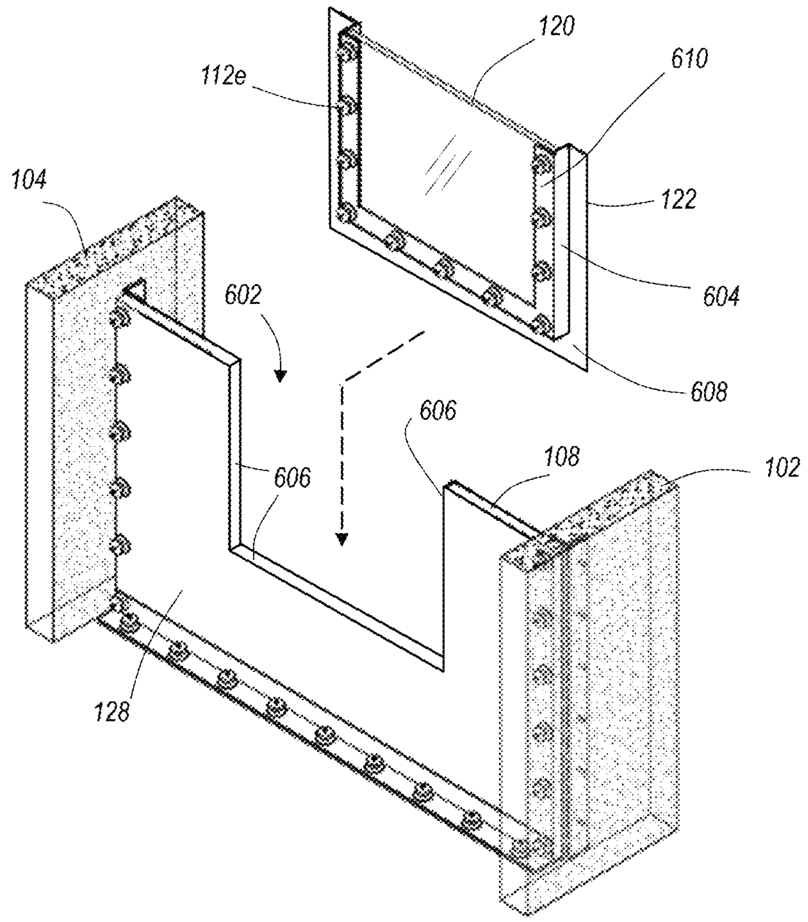
FIG. 6 is a rear perspective view of a flood panel barrier system for a throughway in which a portion of the panel barrier can be removed to facilitate ingress into, or egress from the structure, in accordance with some embodiments.

The flood panel 108 can be on the order of 48" to 60" tall, from the ground edge to the top edge. It can be taller or shorter in some applications. The vertical angled brackets 110, 130 can extend the full height of the flood panel 108. Prior to the arrival of flood waters, with the flood panel barrier system 100 in place, it may be desirable to continue using the throughway to enter or exit the structure. However, at four to five feet tall, it is not possible without climbing over the flood panel 108 and possibly damaging the flood panel 108 and/or loosening the fastening units 112. To facilitate passing through the throughway with the flood panel barrier system 100 in place, the flood panel 108 includes a removable portion 120 that is held in a frame 122 that fits into a corresponding bay 602 of the panel 108. Reference is further made to FIG. 6 here in describing the removable portion 120 and frame 122. The removable panel 120 can be made of a transparent material; this will allow personnel inside the structure to visually gauge the height of flood water once it rises to a level equal to the bottom of the bay 602. The bay 602 can be a rectangular "cutout" at the top of the panel 108 and extending downward. In some embodiments the bay 602 can be on the order of four feet wide and three feet in height. That means that the removable portion 120, and in particular the bay 602, can extend downward, from the top of the flood panel 108, more than half the height of the flood panel 108. The bay can be larger or smaller some applications. With the removable portion 120 and frame 122 removed from the bay 602, a person can step over the center portion of the panel 108 through the bay 602 to exit or enter the structure. The removable portion 120 is fastened to a backing flange portion 610 of the frame 122 that is generally planar, and, when the frame is positioned properly in the bay 602, is co-planar with the rear side 128 of the flood panel 108. A plurality of fastening units 112*e* hold the removable portion 120 in the frame 122 against the backing flange portion 610, passing through the backing flange portion 610 and the removable portion 120 adjacent the edges of the removable portion 120. The frame 120 has a transverse portion 604 at a right angle to the backing flange portion 610 which mates with the edge 606 of the panel 108 around the bay 602, and which extends across the thickness of the planar body of the flood panel 108. The transverse portion 604 also mates with the removeable portion 120 on the opposite side of the transverse portion 604 from the side that mates with the edge 606. A front flange 608 or front flange portion extends outward from the transverse portion 604, at a right angle, and is configured to rest against the front surface 126 of the panel 108. There can be a layer of compliant material disposed on the side of the front flange 608 to act as a gasket. When the frame 122 is placed in the bay 602, the frame 122 is sized so that there is contact between the edge 606 and the transverse portion 604 of the frame around the entirety of the transverse portion 604, but the fit is not so tight as to prevent removal of the panel 122 from the bay 602. With the frame 122 in the bay 602, hydrostatic pressure of flood water, when present, at the front side of the panel 108 will seal the front flange 608 against the front surface 126 of the panel 108.

Figure 3:
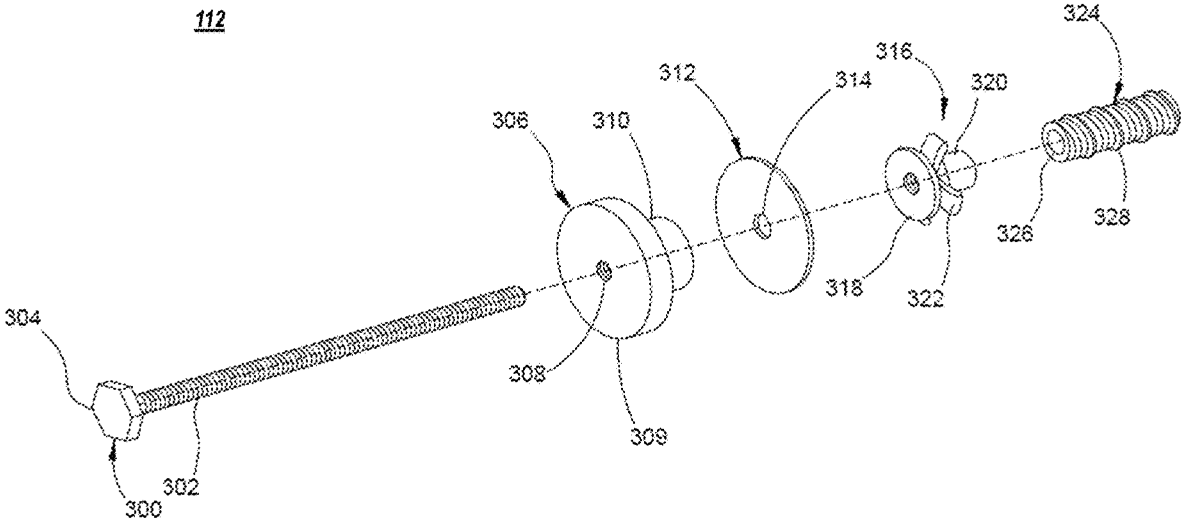
FIG. 3 is an exploded view of a fastener unit for use with a flood panel barrier system, in accordance with some embodiments.

FIG. 3 shows an exploded view of a fastener unit 112 for use with the inventive flood panel barrier system support structure, in accordance with some embodiments. The fastener unit 112 can be any of the fastener units 112*a*-112*e* shown in the other drawings. Each fastener unit 112 includes a bolt 300 which can be a tap bolt. The bolt 300 includes a threaded shank 302 and a head 304 that can be a hex-head, as is well known. An adjustment knob 306 has a threaded through-hole 308 to allow the adjustment knob 306 to thread onto the shank 302 of the tap bolt 300. The main body 309 is puck-shaped and can be knurled or fluted around the outside edge to allow for turning the knob 306. The knob 306 further includes a standoff 310 that can also be puck-shaped, with a smaller diameter than the main body 309, and through which the threaded hole 308 also passes. The standoff 310 allows some space between the main body 309 and the washer 312 to allow a person to get better purchase on the main body 309 when turning the main body 309 and knob 306. The bottom of the standoff portion 310 of the knob 306 bears against the washer 312 to exert a compressive force, and the washer 312 has an opening 314 that is slightly larger than the outside diameter of the threads on the shank 302 of the bolt. Thus, the shank 302 can pass through the washer 312 without having to be threaded through the washer 312. The washer 312 can be a dock washer and have a diameter of about three inches in some embodiments. The bolt 300 can have a length of four to six inches, such as a ⅜"×4" tap bolt.

The distal end of the shank 302 threads into either a rivet nut 316 or an anchor 324, depending on the location of the fastening unit 112. The rivet nut 316 includes a threaded body 320 into which the shank 302 is threaded. A flange 318 extends outward and acts like a washer. There is a collapsible portion 322 that collapses when the bolt is tightened while the flange 318 is bearing against a surface, causing sections of the collapsible portion to collapse and extend outward. The rivet nut is used in fastening units 112*c* and 112*e*. The other fastening units 112*a*, 112*b*, and 112*d* use the anchor 324.

The anchor 324 can be a snake anchor and is intended to fit into a bore, such as a bore into the walls 102, 104 or the ground surface 106, and frictionally engage the sides of the bore so as to become stuck fast in the bore. This can occur, for example, by making the inner diameter of the axial bore 326 of the anchor 324 slightly smaller than the outside diameter of the shank 302 of the bolt 300, and the outside diameter of the body 328 of the anchor 324 is made to be about the same as the diameter of the bore into which the anchor 324 is sunk (e.g. in the walls 102, 104 or ground surface 106). Thus, with the anchor 324 placed into a bore in the walls or ground surface, when the bolt 300 is threaded into the axial bore 326 of the anchor, it will force the body 328 outward against the wall of the bore in the wall or ground surface in which the anchor 324 is sunk.

Figure 4:
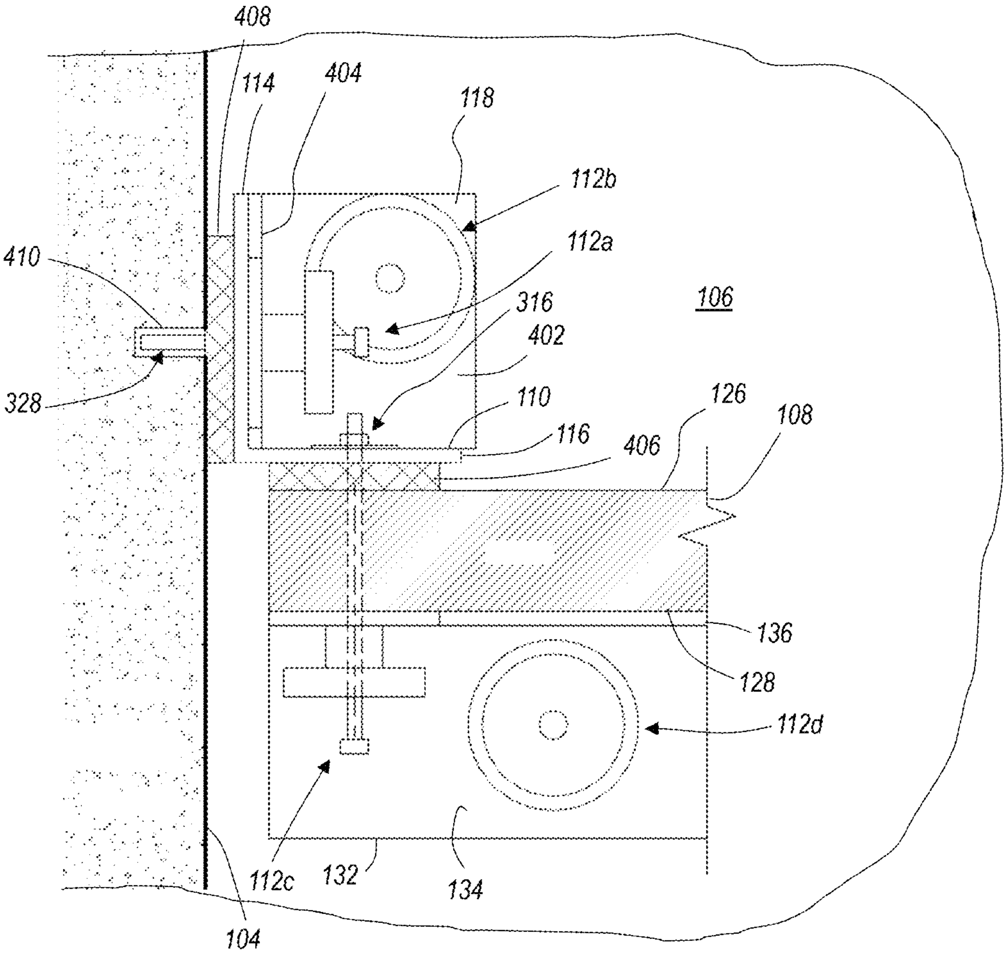
FIG. 4 is a top sectional view of a flood panel barrier system where the flood panel meets one of the opposing walls of the structure, in accordance with some embodiments.

FIG. 4 is a top sectional view of a flood panel barrier system where the flood panel 108 meets one of the opposing walls 104 of the structure, in accordance with some embodiments. The vertical angled bracket 110 is shown with the wall portion 114 and panel portion 116 at a right angle to each other. A wall gasket 408 is compressed between the wall portion 114 and the surface of the wall 104 by fastening unit 112*a*, which has a bolt that threads into an anchor 328 in a bore 410 in the wall 104. A panel gasket 406 is disposed between the panel portion 116 and the front surface 126 of the panel 108, and is compressed by fastening unit 112*c*, which uses a rivet nut 316 rather than an anchor (e.g. 328). At the bottom of the vertical angled bracket 110 is the ground support bracket 118, which has a horizontal portion 402 that bears against the ground surface 106, and a vertical portion 404 that bears against the wall portion 114 of the vertical angled bracket 110. Fastening unit 112*b* fastens the ground support bracket 118 to the ground surface 106.

At the rear side 128 of the panel, there is shown the horizontal angled bracket 132, which has a ground portion 134 that in co-planar with the ground surface 106, and fastened to the ground surface by fastening units 112*d*, compressing a ground gasket 502 (as shown in FIG. 5). The panel portion 136 of the horizontal angled bracket 132 bears against the panel 108 at the rear side 128 of the panel 108.

Figure 5A:
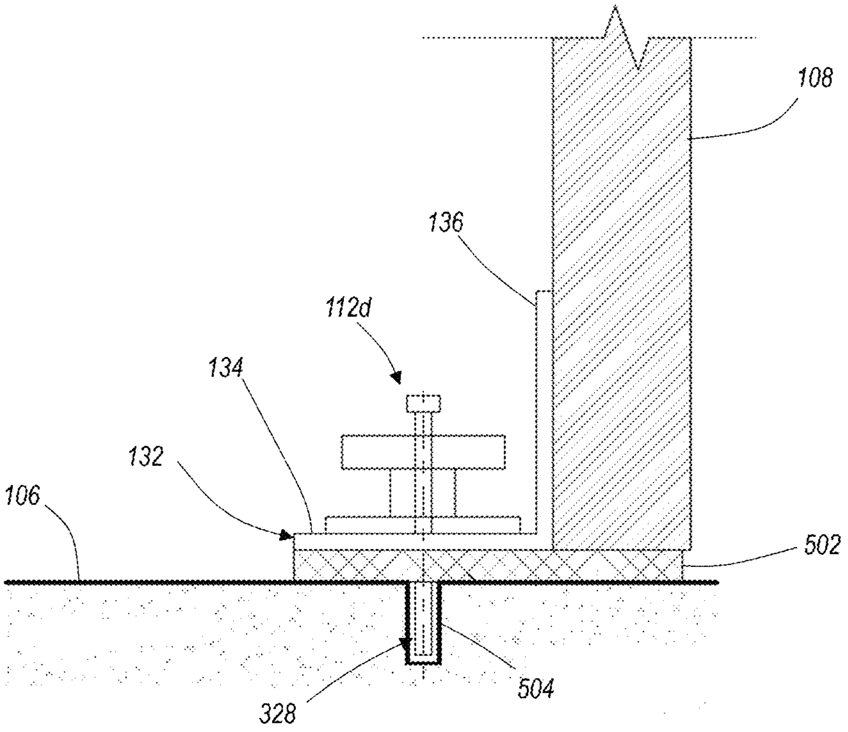
FIG. 5A is a side sectional view of a flood panel barrier system, showing the bottom of the panel, in accordance with some embodiments.
Figure 5B:
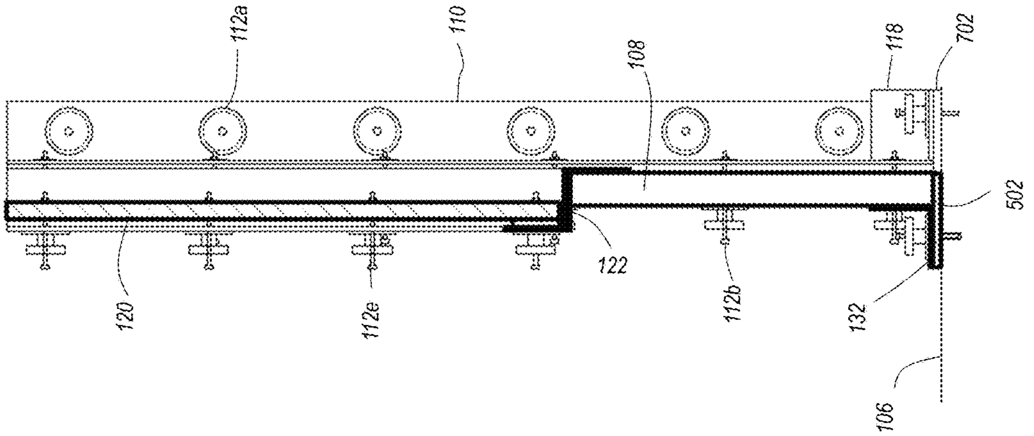
FIG. 5B is a side sectional view of a flood panel barrier system, in accordance with some embodiments.

FIG. 5A is a side sectional view of a flood panel barrier system, in accordance with some embodiments. The section is taken through the panel 108, horizontal angled bracket 132, and floor gasket 502. The floor gasket 502 extends under both the panel 108 and the ground portion 134 of the horizontal angled bracket 132. Fastening units 112*d* fasten the horizontal angled bracket 132 to the ground surface 106. A bore 504 in the ground surface 106 has an anchor 328 embedded in it, which the bolt of the fastening unit 112*d* thread into, causing the anchor to expand outward against the sides of the bore 504. The panel 108 is held in place against the floor gasket by the vertical angled brackets 110, which are not shown in this drawing. FIG. 5B shows a side sectional view of a flood panel barrier system, in which the vertical angled bracket 110 is shown, along with the ground support bracket 118. There is a second floor gasket 702, or an extension of the floor gasket 502, under the ground support bracket 118, which is fastened to the ground surface.

Figure 7:
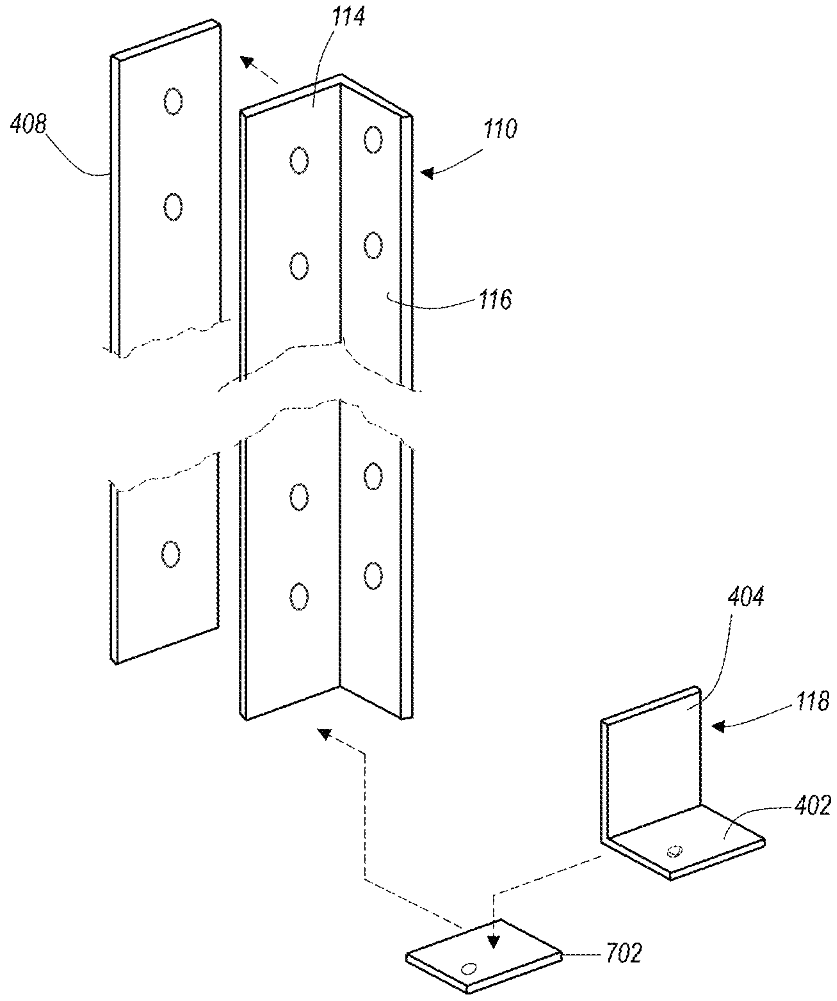
FIG. 7 shows a detail of a vertical angled bracket of fastening a flood panel to a wall, in accordance with some embodiments.

FIG. 7 shows a detail of a vertical angled bracket 110 for fastening a flood panel to a wall, in accordance with some embodiments. The wall portion 114 bears against the wall via a wall gasket 408. The panel portion 116 bears against a panel (not shown). A ground support bracket 118 is shown which bears against the bottom of the vertical angled bracket 110 such that the vertical portion 404 is against the surface of the wall portion 114 of the vertical angled bracket 110, and the horizontal portion 402 is fastened to the ground surface, compressing a floor gasket 702.

A flood panel barrier system has been disclosed that is useful for preventing flood water intrusion into a structure at a throughway of the structure, or between structures. The flood panel barrier system fastens a flood panel between, and to opposing walls, and the ground surface, in a manner that is water tight. This allows the structure itself to be the primary barrier to flood waters, assuming the walls of the structure are water impermeable. The disclosed flood panel can have a removable portion to allow persons to pass through the panel by stepping over the lower portion of the panel and through a bay in which the removeable portion is otherwise placed.

The claims appended hereto are meant to cover all modifications and changes within the scope and spirit of the present invention.

What is claimed is:

1. A flood panel barrier system for a throughway, comprising:

a flood panel having a front side and a rear side, the flood panel extending across a throughway, from a first wall that defines a first side of the throughway to a second wall that is opposite the first wall across the throughway and that defines a second side of the throughway, the flood panel further having a bottom that is against a ground surface, and a top opposite the bottom, a bay formed in the flood panel from the top downward into the flood panel toward the bottom of the flood panel;

a first vertical angled bracket having a wall portion and a panel portion at an angle to each other, the wall portion being fastened to the first wall, the panel portion being fastened to the flood panel at the front side of the flood panel, a first wall gasket disposed between the wall portion and the first wall, and a first panel gasket disposed between the panel portion and the front side of the flood panel;

a second vertical angled bracket having a wall portion and a panel portion at an angle to each other, the wall portion being fastened to the second wall, the panel portion being fastened to the flood panel at the front side of the flood panel, a second wall gasket disposed between the wall portion and the second wall, and a second panel gasket disposed between the panel portion and the front side of the flood panel;

a horizontal angled bracket having a ground portion and a panel portion at an angle to each other, the ground portion being fastened to the ground surface between the first wall and the second wall and having a floor gasket between the ground portion and the ground surface, the panel portion being fastened to the flood panel along the flood panel adjacent the bottom of the flood panel at the rear side of the flood panel; and a removable portion mounted in a frame that is configured to fit into the bay, wherein the removable portion is transparent, and wherein the frame is configured to be in a watertight contact with the frame and creates a seal around the frame.

2. The flood panel barrier system of claim 1, wherein the frame of the removable portion includes:

a backing flange portion that is co-planar with the rear side of the flood panel when the removable portion is positioned in the bay;

a transverse portion formed at a right angle to the backing flange portion that extends from the backing flange portion towards the front side of the flood panel, across a thickness of the flood panel and which mates with an edge of the panel around the bay;

a front flange portion that extends outward from the transverse portion at a right angle at the front side of the flood panel when the removable portion is positioned in the bay, and is configured to rest against the front side of the flood panel; and wherein the transparent member fits in the frame against the backing flange portion and the transverse portion.

3. The flood panel barrier system of claim 1, wherein the bay extends downward into the flood panel more than half a height of the flood panel.

4. The flood panel barrier system of claim 1, wherein the wall portion of the first vertical angled bracket is fastened to the first wall by a first plurality of fastening units, the wall portion of the second vertical angled bracket is fastened to the second wall by a second plurality of fastening units, wherein each fastening unit of the first and second plurality of fastening units includes a bolt, an anchor embedded in a bore into which a distal end of the bolt is threaded, a washer, and an adjustment knob threaded onto the bolt.

5. The flood panel barrier system of claim 1, further including, at the bottom of the first vertical angled bracket, and first ground support bracket, and at the bottom of the second vertical angled bracket, a second ground support bracket.

6. A flood panel barrier system for a throughway between a first wall and a second wall, comprising:

a flood panel having a first side and a second side, the flood panel extending across the throughway from the first wall to the second wall, the flood panel further on a ground surface of the throughway at a bottom of the flood panel, the flood panel having a bay extending from a top of the flood panel downward;

a removable portion mounted a frame, the frame being sized to fit into the bay in a water tight manner;

a first vertical angled bracket having a wall portion and a panel portion at an angle to each other, the wall portion being fastened to the first wall, the panel portion being fastened to the flood panel at the first side of the flood panel, a first wall gasket disposed between the wall portion and the first wall, and a first panel gasket disposed between the panel portion and the first side of the flood panel;

a second vertical angled bracket having a wall portion and a panel portion at an angle to each other, the wall portion being fastened to the second wall, the panel portion being fastened to the flood panel at the first side of the flood panel, a second wall gasket disposed between the wall portion and the second wall, and a second panel gasket disposed between the panel portion and the first side of the flood panel; and a horizontal angled bracket having a ground portion and a panel portion at an angle to each other, the ground portion being fastened to the ground surface between the first wall and the second wall and having a floor gasket between the ground portion and the ground surface, the panel portion being fastened to the flood panel barrier along the flood panel adjacent the bottom of the flood panel at the second side of the flood panel.

7. The flood panel barrier system of claim 6, wherein the frame has a backing flange portion to which the removeable portion is fastened, and a front flange portion that extends outward to bear against a front side of the flood panel.

8. The flood panel barrier system of claim 6, wherein the wall portion of the first vertical angled bracket is fastened to the first wall by a first plurality of fastening units, the wall portion of the second vertical angled bracket is fastened to the second wall by a second plurality of fastening units, wherein each fastening unit of the first and second plurality of fastening units includes a bolt, an anchor embedded in a bore into which a distal end of the bolt is threaded, a washer, and an adjustment knob threaded onto the bolt.

9. The flood panel barrier system of claim 6, wherein the removable portion is transparent.

10. The flood panel barrier system of claim 6, further including, at the bottom of the first vertical angled bracket, and first ground support bracket, and at the bottom of the second vertical angled bracket, a second ground support bracket.

11. A flood panel for a flood panel barrier system, comprising:

a planar body having a back side and a front side, a width that extends from a first vertical edge to a second vertical edge, and a height that extends from a bottom to a top; and a removable portion that fits into a bay in the planar body and extends from the top of the planar body downward, and wherein the removable portion is mounted in a frame that fits into the bay and creates a seal around the frame.

12. The flood panel of claim 11, wherein the frame comprises:

a backing flange portion that partially extends across a back side of the removable portion, a transverse portion that extends at a right angle from the backing flange portion a distance equal to a thickness of the planar body, and a front flange portion that extends outward from the transverse portion at a right angle to the transverse portion, opposite the distance from the backing flange portion.

13. The flood panel of claim 12, wherein the removable portion is fastened to the backing flange portion of the frame.

14. The flood panel of claim 11, wherein the removable portion is transparent.

15. The flood panel of claim 11, wherein the removable portion extends downward more than half of the height of the planar body.

* * * * *